US007849445B2

(12) United States Patent
Tran

(10) Patent No.: US 7,849,445 B2
(45) Date of Patent: Dec. 7, 2010

(54) REMOTE USER INTERFACE FOR EXTERNAL CONNECTIONS

(75) Inventor: Duong-Han Tran, Bad Schoenborn (DE)

(73) Assignee: SAP AG, Walldorf (DE)

( * ) Notice: Subject to any disclaimer, the term of this patent is extended or adjusted under 35 U.S.C. 154(b) by 1386 days.

(21) Appl. No.: 11/314,887

(22) Filed: Dec. 20, 2005

(65) Prior Publication Data

US 2007/0143301 A1 Jun. 21, 2007

(51) Int. Cl.
*G06F 9/45* (2006.01)
(52) U.S. Cl. ...................................... 717/124
(58) Field of Classification Search .................. 717/124
See application file for complete search history.

(56) References Cited

U.S. PATENT DOCUMENTS

| | | | |
|---|---|---|---|
| 5,325,530 A | | 6/1994 | Mohrmann |
| 5,819,093 A | * | 10/1998 | Davidson et al. ............ 717/126 |
| 5,970,248 A | | 10/1999 | Meier |
| 6,058,393 A | | 5/2000 | Meier et al. |
| 6,202,200 B1 | | 3/2001 | House et al. |
| 6,263,456 B1 | | 7/2001 | Boxall et al. |
| 6,741,586 B1 | | 5/2004 | Schuster et al. |
| 7,216,257 B2 | | 5/2007 | Kilian |
| 7,444,552 B2 | * | 10/2008 | Kilian .................. 714/43 |
| 7,552,425 B2 | | 6/2009 | Bates et al. |
| 7,606,893 B2 | | 10/2009 | Petrov et al. |
| 7,634,760 B1 | * | 12/2009 | Gumtow et al. ............. 717/125 |
| 2002/0120815 A1 | | 8/2002 | Zahavi et al. |
| 2003/0110473 A1 | | 6/2003 | Kadlecik et al. |
| 2003/0196192 A1 | | 10/2003 | Barclay et al. |
| 2004/0123271 A1 | * | 6/2004 | Bindewald et al. .......... 717/124 |
| 2005/0132337 A1 | | 6/2005 | Wedel et al. |
| 2005/0138113 A1 | * | 6/2005 | Brendle et al. .............. 709/203 |
| 2006/0101405 A1 | | 5/2006 | Buschardt et al. |
| 2007/0006165 A1 | | 1/2007 | Lam et al. |
| 2007/0053367 A1 | | 3/2007 | Tyebji |
| 2007/0143795 A1 | | 6/2007 | Tran |
| 2007/0168997 A1 | | 7/2007 | Tran |
| 2008/0126798 A1 | | 5/2008 | Ginter et al. |
| 2010/0034200 A1 | | 2/2010 | MeLampy et al. |

OTHER PUBLICATIONS

Harkema et al., Performance Monitoring of Java Applications, ACM, p. 114-127.*

Office Action dated Nov. 12, 2009, issued in U.S. Appl. No. 11/313,975.

(Continued)

*Primary Examiner*—John Chavis
(74) *Attorney, Agent, or Firm*—Finnegan, Henderson, Farabow, Garrett & Dunner LLP

(57) ABSTRACT

Methods and systems for a remote user interface and remote debugging in a computer system comprising an application server and at least two client systems are provided. A first client operated by a user wishing to debug a remote application running between a second client and the application server registers at the application server. The application server invokes a user interface at the first client from the application system, based on information provided at registration. Using the present invention, in an SAP environment, developers can use the user interface for interactive actions and also debug running of an application, whether on an SAP or non-SAP system, from a remote location.

17 Claims, 3 Drawing Sheets

OTHER PUBLICATIONS

Office Action dated May 27, 2010, issued in U.S. Appl. No. 11/313,975.
Availability Monitoring and Agent CCMSPING, Sep. 21, 2004, SAP AG, available from http://www.sdn.sap.com/, 22 pages.
U.S. Appl. No. 11/313,974: Final Office Action, dated May 25, 2010.
U.S. Appl. No. 11/313,974: Non-Final Office Action, dated Nov. 13, 2009.
U.S. Appl. No. 10/740,384: Non-Final Office Action, dated Mar. 15, 2010.
U.S. Appl. No. 10/740,384: Advisory Action, dated Nov. 30, 2009.
U.S. Appl. No. 10/740,384: Final Office Action, dated Sep. 3, 2009.
U.S. Appl. No. 10/740,384: Non-Final Office Action, dated Dec. 22, 2008.

* cited by examiner

REMOTE USER INTERFACE FOR EXTERNAL CONNECTIONS

FIELD OF THE INVENTION

The present invention relates to methods and systems for providing a remote user interface to monitor a connection between an application system and an external system.

BACKGROUND OF THE INVENTION

An enterprise services network is an open architecture incorporating services oriented architecture principles and web services technologies applied to enterprise business applications. Web services, and enterprise services networks, employ open standards, such as Extensible Markup Language (XML), Web Services Description Language (WSDL), HyperText Transfer Protocol (HTTP), Secure HyperText Transfer Protocol (S-HTTP or HTTPS), Simple Object Access Protocol (SOAP), Universal Description, Discovery and Integration (UDDI), Business Process Modeling Language (BPML), Business Process Execution Language (BPEL), and others, to allow for system integration independent of technical architecture and interoperability between even disparate platforms. Enterprise services allow IT organizations to develop applications, that is, applications that combine functionality and information from various, existing, application systems to support new business processes or scenarios. Web services that provide the functionality of one application system are also called "application services."

Many enterprise services networks are non-heterogeneous, that is, they include several different customer and vendor platforms. For example, an enterprise services network may include SAP systems, such as SAP's NetWeaver™, SAP's development and integration platform running Advanced Business Application Programming (ABAP), SAP's application programming language, or an Internet Transaction Server (ITS), and non-SAP systems, such as a platform running Java 2 Platform Enterprise Edition™ (J2EE), such as IBM's WebSphere. An ITS is an interface that enables efficient communication between an SAP R/3 system of applications and the Internet, enabling user access to Internet application components, which are Web-enabled business applications for the R/3 system. J2EE is the standard platform, developed collaboratively by Sun Microsystems and other software vendors, for developing multi-tier enterprise applications based on the Java programming language.

On non-heterogeneous networks, each system normally has its own user interface, where each user interface has multiple software modules that are used during runtime reused to reduce the cost of development and/or to avoid writing new software. Moreover, on non-heterogeneous networks, it can be difficult to debug errors that occur during running of an application, particularly an application on a non-SAP system.

For example, in an SAP environment, an ABAP application can invoke a SAP Graphical User Interface (GUI) to the currently running external system. After a request is sent to the SAP GUI, the developer enters user input that is transmitted back to the ABAP application. Once the SAP GUI is started, a developer can activate the ABAP Debugger programming tool to debug the external system by, for example, displaying data objects and checking the flow logic of programs.

However, difficulties arise when a developer is located at a computer other than the one where the external application to be debugged is running. First, SAP GUI uses a RFC (Remote Function Call) protocol, which is the SAP ABAP programming language implementation similar to the remote procedure call (RPC) over TCP/IP protocol. Using conventional methods, a SAP GUI can only be invoked from a remote server on the computer where the RFC client is running and not on any other computer in the enterprise service network. Furthermore, debugging of external connections using HTTP/HTTPS or WebServices as a communication protocol is not possible at all.

SUMMARY OF THE INVENTION

In accordance with the invention, methods and systems for remote debugging in a computer system comprising an application server and at least two client systems are provided. A first client registers at an application server. A second client runs an application at the application server, wherein running the application comprises at least one transaction between the application server and the second client. The application invokes a user interface at the first client from the application system based on the information provided at registration. The user interface can then monitor the at least one transaction between the application server and the second client and provide debugging information to the developer at the first client.

It is to be understood that both the foregoing general description and the following detailed description are exemplary and explanatory only and are not restrictive of the invention, as claimed. These and other embodiments are further discussed below with respect to the following figures.

DESCRIPTION OF THE EMBODIMENTS

Reference will now be made in detail to the exemplary embodiments of the invention, the examples of which are illustrated in the accompanying drawings. Wherever possible, the same reference numbers will be used throughout the drawings to refer to the same or like parts.

Figure 1:
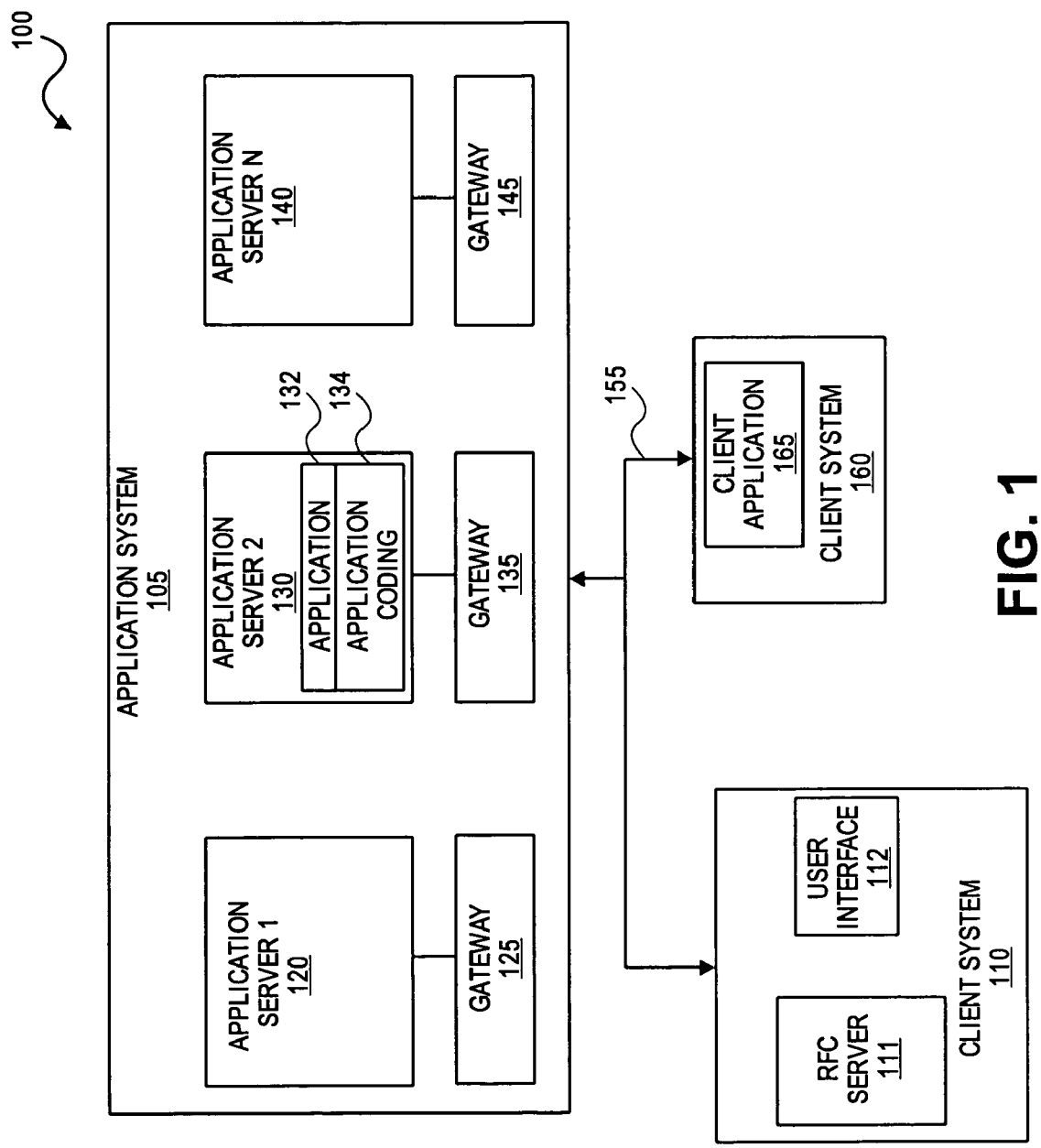
FIG. 1 is a block diagram of an exemplary system for providing a remote user interface for an external connection consistent with the present invention.

FIG. 1 is a block diagram of an exemplary system 100 for providing a remote user interface for an external connection consistent with the present invention. In an exemplary embodiment, system 100 includes an application system 105 and at least two client systems 110 and 160.

As shown in FIG. 1, application system 105 may include one or more application servers 120, 130, 140. In some exemplary embodiments, application system 105 may be a platform running SAP's NetWeaver, SAP's suite of development and integration components. One of the components of SAP's NetWeaver is SAP Web Application Server (SAP Web AS), which supports both ABAP code and Java code that meets the J2EE specifications.

Application system 105, and consequently each of application servers 120, 130, 140, communicates with client systems 110 and 160 via gateways 125, 135, or 145. Gateways 125, 135, or 145 may be, for example, a server, a router, a firewall server, a host, or a proxy server. Gateways 125, 135, 145 provide a standardized interface for system-wide communication between systems. In the exemplary embodiment shown in FIG. 1, gateway 135 enables application 132 (via application coding 134) and external applications, such as client application 165, to communicate with each other. External applications may register at gateways 125, 135, 145 to enable the communication with its respective application server. Gateways 125, 135, 145 can connect dissimilar networks by converting different protocols, transfer speeds, and different codes. Any of gateways 125, 135, 145 can act as an entrance to the application system 105 by connecting the client system 110 or client system 160 to the application system 105. While three gateways 125, 135, and 145 are shown in FIG. 1, it will be readily appreciated that any number of gateways can be located on the application system 105.

Gateways 125, 135, 145 communicate with client system 110 and client system 160 using conventional network connections 155. Conventional network connections 155 may include, alone or in any suitable combination, a telephony-based network, a local area network (LAN), a wide area network (WAN), a dedicated intranet, wireless LAN, the Internet, a wireless network, a bus, or any other any communication mechanisms. Further, any suitable combination of wired and/or wireless components and systems may be used to provide network connections 155. Moreover, network connections 155 may be embodied using bi-directional or unidirectional communication links. Further, network connections 155 may implement protocols, such as Remote Function Call (RFC), Transmission Control Protocol/Internet Protocol (TCP/IP), Hyper Text Transfer Protocol (HTTP), Simple Object Access Protocol (SOAP), and the like. Furthermore, network connections 155 can include different communication protocols.

As shown in FIG. 1, application server 130 includes an application 132 and application coding 134. Although shown only with respect to application server 130, each of application servers 120, 140 may likewise include an application 132 and application coding 134. Application 132 may be any enterprise application such as, for example, SAP's Customer Relationship Management (CRM) or Supply Chain Management (SCM) products. Application 132 may also be a composite application, such as any of the components of SAP's xApps family, or may be a custom application. Application 132 can also be activated by the client application 165 running on the client system 160.

Application coding 134 can invoke a user interface on any other computer in an enterprise service network, send data to the user interface to display, and receive input data from the user interface. The application coding 134 translates returning messages and data into the appropriate format for transmission back to the client application 165 on client system 160 over gateway 135. For example, application coding 134 may translate messages generated by application 132 into message formats used by the network protocols mentioned above, that is, TCP/IP, HTTP, SOAP, RFC, and the like. Application coding 134 may also translate data generated by application 132 into standard data formats such as XML, WSDL, and the like. Methods consistent with the present invention for invoking a user interface on any other computer in the enterprise service network, sending data for output at the user interface and receiving input from the user interface will be described in more detail below.

Client system 110 is remote from the external system and can be remote from the application system. Client system 110 may be, for example, a conventional personal computer (PC) or other computing device including, for example, a processor, a random access memory (RAM), a program memory (for example, read-only memory (ROM), a flash ROM), a hard drive controller, a video controller, and an input/output (I/O) controller coupled by a processor (CPU) bus. In certain embodiments, a display (not shown) and one or more user input devices (not shown) can be coupled to client system 110 via an I/O bus. Alternatively, separate connections (separate buses) can be used for the display and the user input devices. While one client system 110 is shown in FIG. 1, any number of client systems may be connected to application system 105. Client system 110 allows a user to display, access, and manipulate data located at the application system 105. Client system 110 receives user commands and data as input and displays result data as output.

Client system 110 may have one or more modules or tools, such as RFC server 111, and one or more user interfaces, such as user interface 112

RFC server 111 is a server that offers functions to be called by the application coding 134 on the application system 105. RFC server 111 can be initiated by a user, by gateway 135, or by one or more application servers 120, 130, or 140. In addition, the RFC server 111 can be used to register client system 110 with the gateway 135 or application server 130 and wait for call requests. By registering, the RFC server 111 or client system 110 can receive call backs from applications system 105 or gateway 135. While the RFC server 111 is specified above, any remote procedure call server can be used. The registered RFC server 111 may include, for example, an RFC server program which offers functions in SAP's RFC Software Development Kit (SDK) or any other remote procedure call program.

The user interface 112 can be, for example, a web-based interface having a web browser or can be a non-web interface, such as a SAP GUI. User interface 112 supports client-side processing and allows a user to access and complete software transactions in an application system 105. The user interface 112 can be invoked by the registered RFC server 111 receiving a request from the gateway 135 or the one or more application server 120, 130, or 140. In some embodiments, the user interface 112 can invoke additional user interfaces.

Client system 160 is an external system remote from the application system. Client system 160 may be, for example, an ABAP server, a J2EE server, an Internet Transaction Server (ITS), or an SAP-Business Connector (SAP-BC) system. Client system 160 includes at least a processor, a random access memory (RAM), and a program memory (for example, read-only memory (ROM), a flash ROM), and is operatively connected to a display and at least one input device. In some embodiments, client system 160 also includes a memory buffer 165, which may in some examples be part of the RAM, ROM, or other memory. Also, in some embodiments, client system 160 includes at least one client application 165. The execution of client application 165 can be monitored by the user interface 111 through the application coding 134. Client system 160 may also comprise a web browser (not shown).

The present invention can be used in a secure or a non-secure mode to invoke and assign a user interface to a currently-running session between an application and an external application. The present invention uses the "registering" feature of the RFC server for external systems to initiate the user interface, such as a SAPGUI, for monitoring interactive actions and provides a function module within the application system, such as an ABAP backend, that the application coding calls by providing information about the registered RFC server. To use the present invention, the software module SAP Frontend (SAPLOGON/SAP GUI) is installed on the client system 110 before registration.

Figure 2:
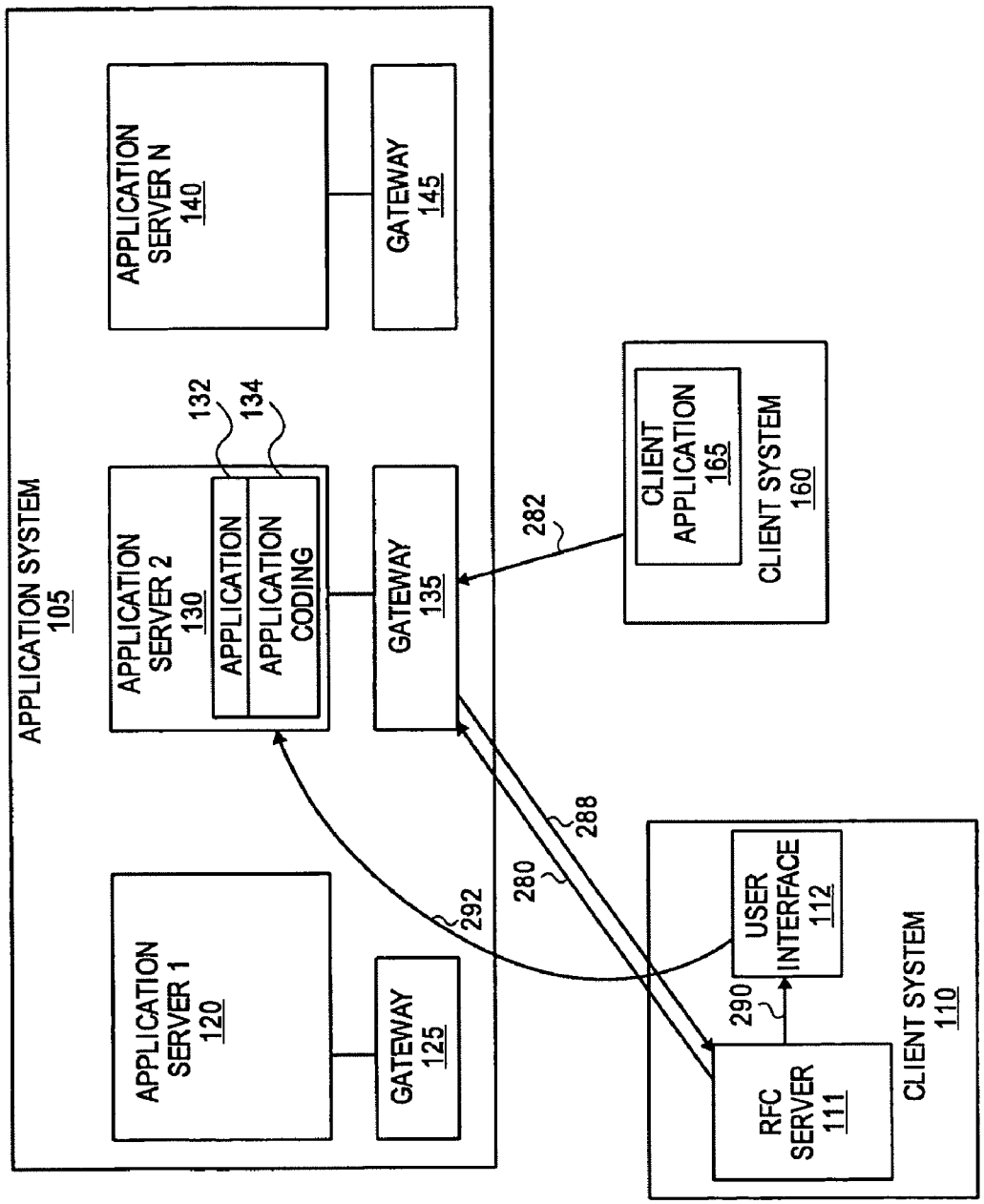
FIG. 2 is a functional diagram showing message flow in the exemplary system in FIG. 1 for providing a remote user interface for an external connection consistent with the present invention.

FIG. 2 is a functional diagram showing message flow in the exemplary system in FIG. 1 for providing a remote user interface for an external connection consistent with the present invention. In this exemplary embodiment, it is assumed that an external connection already exists between client system 160 and application server 130.

First, the user wishing to invoke a remote user interface for an external connection initiates the RFC server program 111 on the client system 110 and registered at application system 105 (280), optionally via gateway 135. Client system 110 may register at gateway 135 in a secure mode by, for example, invoking the RFC program RemoteSapgui and passing via update the RemoteSapgui.properties. The properties to be passed may include, for example, the Progam_Id of the RFC server, the Host name of the SAP Gateway, the service of the SAP gateway, and the server ID. In secure mode, the server ID is checked by the application server to determine if the communication between the client system 110 and the application system 105 is secure.

After the RFC server 111 is registered and running, the application wishing to invoke a remote user interface for an external connection receives information about the registered RFC server 111, such as the gateway where RFC server 111 is registered and under which program ID. The application can then call the ABAP function module SRGUI_INVOKE by passing the gateway information, the program ID and, in secure mode, the server ID. The information about the gateway may be ignored if the gateway is one of the SAP gateways of the ABAP backend because SRGUI_INVOKE will try to determine an appropriate registered RFC server, if one exists. In a secure mode, the function SRGUI_INVOKE checks the server ID passed to this function when calling with the one returned by the Registered RFC server 111.

After the RFC server registers with gateway 135, the client application 165 at the client system 160 initiates communication by, for example, requesting (282) services from the application coding 134 via gateway 135. If application 132 was already running when RFC server 111 registers, client application 165 at client server 160 receives the updated application coding 134 with the next request to the application server 130.

Use of the updated application coding will cause application server 130 to send a request to registered RFC server 111 (288). The request may be to invoke a user interface by a command, such as the SRGUI_invoke command that initiates a SAP GUI. Via the SRGUI_INVOKE command, the application passes the PROGAM_ID and SERVER_ID to invoke and assign a SAP GUI. In secure mode, a user interface can only be invoked if the certain parameters at the application coding match parameters returned by the registered RFC server. For example, a SAP GUI can be invoked and assigned on client system 110 if the provided SERVER_ID matches with the SERVER_ID returned by the registered RFC server. In addition, information about the gateway need only be passed if the RFC server is registered on a gateway outside the application system.

In some embodiments, for example, a user can call function module SRGUI_SET_INVISIBLE to make the SAP GUI invisible between the last response and the next request to have a better overview on the desktop. This mode is sometimes referred to as "SOWA" or See Only What Active.

In a non-secure mode, the executable srfcserv.exe, available with SAP's RFC SDK may be initiated. The executable may be initiated by:

srfcserv-a<PROGRAM_ID>-g<GW-Hostname>-x<GW-Service>.

After a communication is initiated by external client, the application can then call the function module SRGUI_INVOKE and pass the PROGAM_ID and SERVER_ID to invoke and assign a SAP GUI. Information about the SAP gateway need only be passed if the RFC server is registered on a SAP gateway outside the application system 105. In the non-secure mode, the only ID check that is performed is whether the provided PROGRAM_ID matches with the one sent by the registered RFC server.

In some embodiments, particularly those involving Java-based clients, registered RFC server 111 may use SAP Java Connector (SAP JCO) to pass necessary parameters to the gateway 135. SAP JCO provides an API, which enables communication with SAP systems by Java-based systems.

Once the RFC server at the client system 110 receives the user interface start request, the user interface 112, such as SAP GUI, is invoked (290). The user interface 112 connects (292) to the application server 130 so that the user interface 112 becomes the user interface for the application coding within application system 105, which includes the interactions of the application 132 and the client application 165 at the client system. Once the remote user interface is started, a user at the client system 110 can activate a debugger, such as ABAP debugger, to debug the current application. In certain embodiments, the user interface (in this example, the SAPGUI) automatically stops when the external connection is closed.

Figure 3:
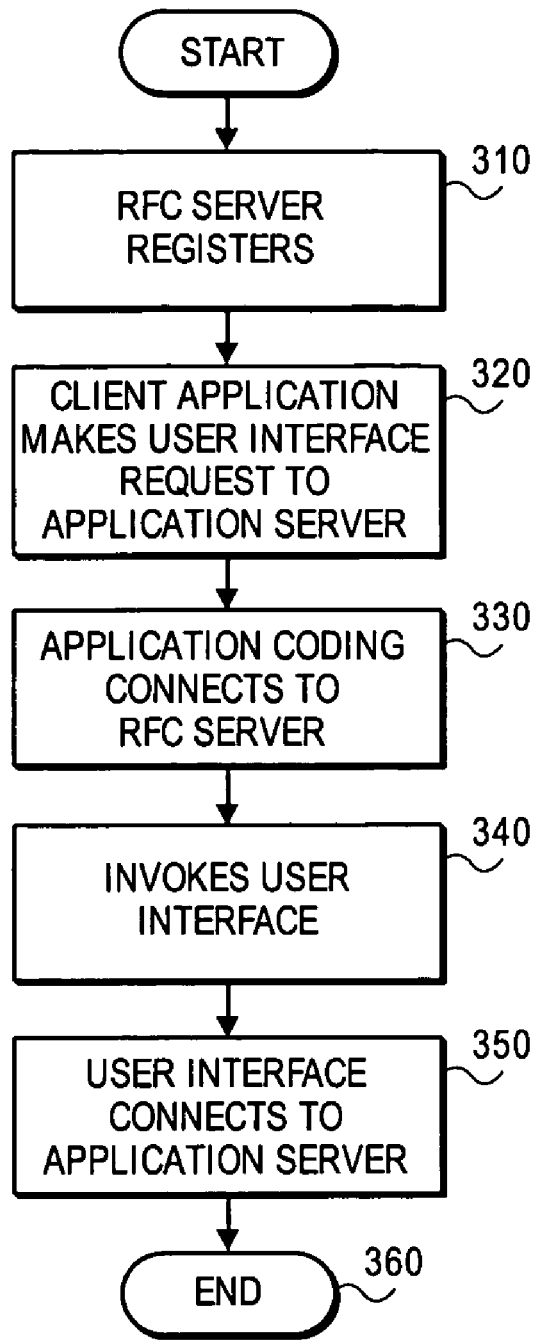
FIG. 3 is a flow chart representing an exemplary method for providing a remote user interface for an external connection.

FIG. 3 is a flow chart representing an exemplary method for providing a remote user interface for an external connection. The method in FIG. 3 will be described with reference to the exemplary system shown in FIG. 1. To begin, an RFC server 111 on the client system 110 registers (310) at a gateway of the application system 105 (i.e. gateway 135). In some embodiments, the RFC server 111 registers at the gateway as soon as the RFC server has been initiated. The registration information passed between the RFC server 111 and the gateway 135 includes properties, such as program ID, which can be later sent to the application 132. For example, the application coding 134 calls the ABAP function SRGUI_INVOKE to request the registered RFC server 111 to start and assign an SAP GUI to this application.

After the RFC server 111 is registered, client application 165 makes a request service to the application coding 134 through the gateway 135 (320). The application coding 134 calls a function, for example the ABAP function SRGUI_INVOKE, to connect to the RFC server 111 for invoking and assigning a user interface to the currently running external connection.

In a secure mode, this ABAP function requests the registered RFC server program for a server ID. If this ID matches the passed server ID when calling this ABAP function, the ABAP function sends a SAP GUI start request to the RFC library running from within the RFC server program 111. In an unsecure mode, the ABAP function sends the SAP GUI start request directly to the RFC library as above.

Once RFC server 111 at the client system 110 receives the user interface start request, a user interface 112, such as SAP GUI, is invoked (step 340). The user interface 112 connects (350) to the application server 130 so that the user interface 112 becomes the user interface for the interactions of the application coding 134 and/or the client application 165 located at the client system 160.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for remote debugging in a computer system comprising an application server and at least two client systems, the method comprising:
    registering a first client at an application server;
    running, from a second client, an application at the application server, wherein running the application comprises at least one transaction between the application server and the second client; and
    invoking a user interface at the first client from the application server, the user interface monitoring the at least one transaction between the application server and the second client.

2. The method of claim 1, wherein the user interface monitors the at least one transaction by collecting information relating to the at least one transaction between the application server and the second client that may be used for debugging.

3. The method of claim 1, wherein registering a first client at an application server comprises passing to the application server from the first client information relating to one or more of a program ID, a server ID, a host name, and a service.

4. The method of claim 1, wherein registering a first client at an application server comprises:
    registering a first client at an application server in secure mode by passing to the application server from the first client a server ID.

5. The method of claim 4, further comprising:
    authenticating the first client based on the server ID.

6. The method of claim 1, wherein the user interface monitors the at least one transaction between the application server and the second client without influencing the program flow of the application.

7. A method for performing debugging in a computer system comprising an application server and at least two client systems, the method performed at a first client comprising:
    registering at the application server;
    receiving a request from the application server based on the information provided at registration;
    invoking a user interface based on the request;
    monitoring via the user interface at least one transaction between the application server and a second client.

8. The method of claim 7, wherein the user interface monitors the at least one transaction by collecting information relating to the at least one transaction between the application server and the second client that may be used for debugging.

9. The method of claim 7, wherein registering at the application server comprises passing to the application server information relating to one or more of a program ID, a server ID, a host name, and a service.

10. The method of claim 7, wherein registering at the application server comprises:
    registering at an application server in secure mode by passing to the application server a server ID associated with the first client.

11. The method of claim 10, further comprising:
    authenticating the first client at the application server based on the server ID.

12. A system comprising:
    an application system that includes one or more application servers configured to provide an executable application;
    an external system configured to run an application that comprises at least one transaction between the application system and the external system;
    a client configured to register at an application system and invoke a user interface based on a request from the application system, the user interface monitoring the at least one transaction between the application server and the second client.

13. The method of claim 12, wherein the user interface monitors the at least one transaction by collecting information relating to the at least one transaction between the application server and the second client that may be used for debugging.

14. The system of claim 12, wherein the client is further configured to register at the application system by passing to the application system information relating to one or more of a program ID, a server ID, a host name, and a service.

15. The system of claim 12, wherein the client is further configured to register in secure mode by passing a server ID to the application system.

16. The system of claim 15, wherein the application system is further configured to authenticate the client based on the server ID.

17. The system of claim 12, wherein the user interface monitors the at least one transaction between the application system and the client without influencing the program flow of the application.

* * * * *